US008947494B2

(12) United States Patent
Abe et al.

(10) Patent No.: US 8,947,494 B2
(45) Date of Patent: Feb. 3, 2015

(54) POINTER INFORMATION PROCESSING DEVICE, COMPUTER-READABLE RECORDING MEDIUM AND CONFERENCE SYSTEM

(71) Applicant: Fujitsu Limited, Kawasaki-shi (JP)

(72) Inventors: Hideki Abe, Isehara (JP); Hiroaki Kameyama, Kawasaki (JP); Masayoshi Hashima, Kawasaki (JP); Yuichi Sato, Yamato (JP)

(73) Assignee: Fujitsu Limited, Kawasaki (JP)

( * ) Notice: Subject to any disclaimer, the term of this patent is extended or adjusted under 35 U.S.C. 154(b) by 184 days.

(21) Appl. No.: 13/656,889

(22) Filed: Oct. 22, 2012

(65) Prior Publication Data

US 2013/0106986 A1    May 2, 2013

Related U.S. Application Data

(63) Continuation of application No. PCT/JP2010/058392, filed on May 18, 2010.

(51) Int. Cl.
*H04N 7/15* (2006.01)
*G06F 3/0354* (2013.01)
*G06F 3/042* (2006.01)

(52) U.S. Cl.
CPC .............. *H04N 7/15* (2013.01); *G06F 3/03542* (2013.01); *G06F 3/0425* (2013.01)
USPC ................... 348/14.08; 348/14.09; 348/14.12

(58) Field of Classification Search
CPC ...... G06F 3/03542; G06F 3/0425; H04N 7/15
USPC .................... 348/14.01–14.16; 345/157, 156; 709/204; 715/753
See application file for complete search history.

(56) References Cited

U.S. PATENT DOCUMENTS

| 2008/0024443 | A1* | 1/2008 | Horikiri | 345/157 |
| 2010/0118202 | A1* | 5/2010 | Yoshida | 348/581 |
| 2011/0141009 | A1  | 6/2011 | Izumi | |

FOREIGN PATENT DOCUMENTS

| JP | 7-200160    | 8/1995 |
| JP | 2002-244813 | 8/2002 |
| JP | 2009-15473  | 1/2009 |
| JP | 2010-15553  | 1/2010 |

OTHER PUBLICATIONS

International Search Report of Corresponding PCT Application PCT/JP2010/058392 mailed Jul. 13, 2010.

* cited by examiner

*Primary Examiner* — Melur Ramakrishnaiah
(74) *Attorney, Agent, or Firm* — Staas & Halsey LLP

(57) ABSTRACT

A pointer information processing device includes a memory and a processor coupled to the memory. The processor executes a process including acquiring a position of a conference participant in a first image captured toward the conference participant, detecting a light-emitting point of a laser pointer, detecting a radiated point of the laser pointer, identifying the conference participant that is using the laser pointer having the light-emitting point by comparing a position of the detected light-emitting point within the first image to the acquired position of the conference participant, associating the detected light-emitting point with the detected radiated point, and recording respective position information of the detected light-emitting point and the detected radiated point associated with each other at the associating and information about the conference participant identified at the identifying in the memory in an associated manner.

5 Claims, 10 Drawing Sheets

FIG.3

| NAME OF CONFERENCE PARTICIPANT | FACE RECOGNITION TEMPLATE |
|---|---|
| TOKKYO TAROU | ... |
| TOKKYO HANAKO | ... |
| ... | ... |
| ... | ... |
| ... | ... |

FIG.4

| ID NUMBER | NAME OF CONFERENCE PARTICIPANT | POINTER INFORMATION ||
| | | LIGHT-EMITTING POINT COORDINATES | RADIATED POINT COORDINATES |
|---|---|---|---|
| 001 | TOKKYO TAROU | (a, b) | (c, d) |
| 002 | TOKKYO HANAKO | (e, f) | (g, h) |
| ... | ... | ... | ... |
| ... | ... | ... | ... |
| ... | ... | ... | ... |

FIG.5

| ID NUMBER | POINTER INFORMATION ||||
| --- | --- | --- | --- | --- |
| | LIGHT-EMITTING POINT COORDINATES | RADIATED POINT COORDINATES | LUMINANCE DATA | MOVEMENT PREDICTION DATA |
| 001-1 | (a, b) | - | ... | ... |
| 001-2 | - | (c, d) | ... | ... |
| 002-1 | (e, f) | - | ... | ... |
| 002-2 | - | (g, h) | ... | ... |
| ... | ... | ... | ... | ... |
| ... | ... | ... | ... | ... |

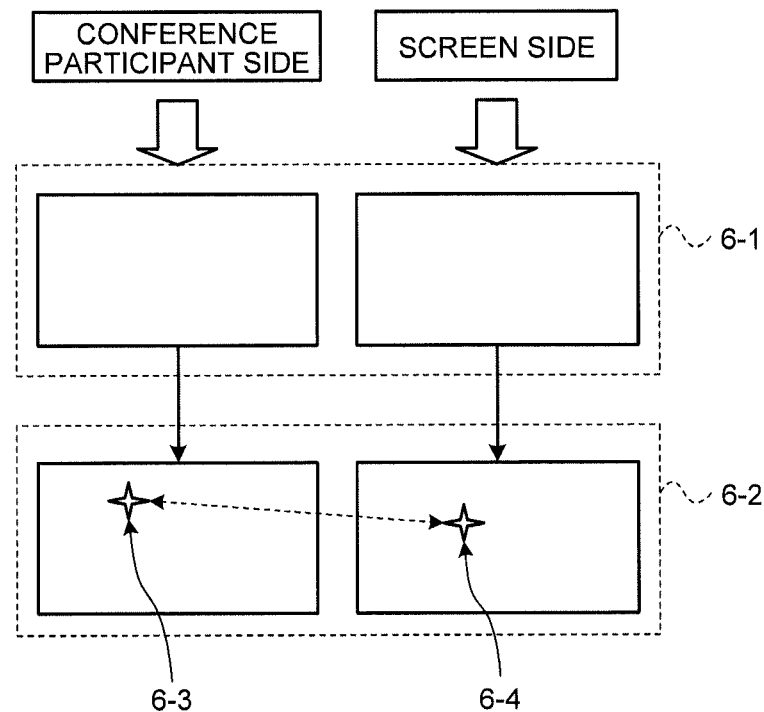
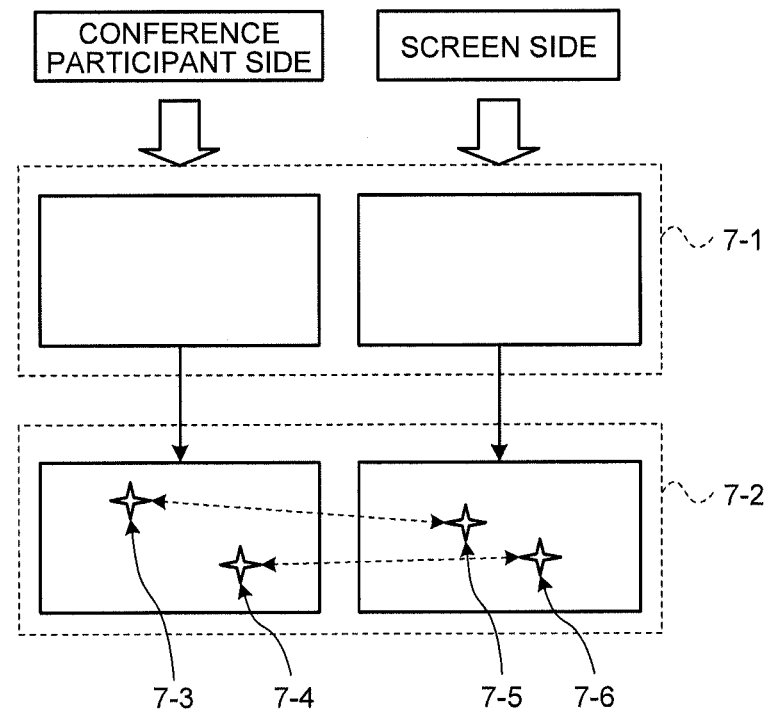

POINTER INFORMATION PROCESSING DEVICE, COMPUTER-READABLE RECORDING MEDIUM AND CONFERENCE SYSTEM

CROSS-REFERENCE TO RELATED APPLICATION

This application is a continuation of International Application No. PCT/JP2010/058392, filed on May 18, 2010 and designating the U.S., the entire contents of which are incorporated herein by reference.

FIELD

The present invention relates to a pointer information processing device, a computer-readable recording medium, and a conference system.

BACKGROUND

There has been a technique related to a remote conference system for conducting a conference or a discussion by exchanging a voice or a video via a communication line between a plurality of positions in difference places. In the remote conference system, a laser point is frequently used when pointing at a screen for projection provided within a conference room.

When the laser pointer is used at a remote conference, for example, on a conference room side where the laser pointer is used, image information projected on the screen for projection is associated with pointer information indicating a position of a radiated point of the laser pointer radiated on the screen. Then, the video information and the pointer information associated with each other on the conference room side where the laser pointer is used are transmitted from the conference room side where the laser pointer is used to another conference room side conducting the remote conference. In this way, the position of the radiated point of the laser pointer may be shared between positions where the remote conference is conducted.

In addition, a technique is suggested to identify a person that radiates a radiated point of a laser pointer radiated on a screen. For example, a technique is suggested to wirelessly acquire "ON/OFF" of a switch operated by a radiating person when a laser light is radiated from a laser pointer. In addition, a technique is suggested to recognize a difference in flickering interval between radiated points on a screen by causing a radiated point of a laser pointer to flicker at a unique flickering interval. In addition, a technique is suggested to change a shape of a radiated point of a laser pointer for each laser pointer. When a radiation of a laser pointer is detected using these techniques, it is possible to identify a person that radiates a radiated point of the laser pointer by comparing the radiation with a position of a conference participant prepared in advance.

Patent Document 1: Japanese Laid-open Patent Publication No. 07-200160
Patent Document 2: Japanese Laid-open Patent Publication No. 2002-244813

However, the above-described technique for identifying a person that radiates a radiated point of a laser pointer has a problem in that a device needs to be mounted in the laser pointer. For example, a device is used to send a wireless signal in response to "ON/OFF" of a switch operated by a radiating person when radiating a laser light from a laser pointer. In addition, a device is used to cause a radiated point of a laser pointer to flicker at a unique flickering interval. In addition, a device is used to change a shape of a radiated point of a laser pointer.

SUMMARY

According to an aspect of an embodiment of the invention, a pointer information processing device includes a memory and a processor coupled to the memory. The processor executes a process includes acquiring a position of a conference participant in a first image captured toward the conference participant, detecting a light-emitting point of a laser pointer by binarizing a pixel value included in each pixel within the first image capturing the direction of the conference participant based on a predetermined threshold value, detecting a radiated point of the laser pointer by binarizing a pixel value included in each pixel within a second image captured toward an object to which the laser pointer radiates a laser light based on a predetermined threshold value, identifying the conference participant that is using the laser pointer having the light-emitting point by comparing a position of the detected light-emitting point within the first image to the acquired position of the conference participant, associating the detected light-emitting point with the detected radiated point upon a condition that the detected light-emitting point and the detected radiated point are each singular, and recording respective position information of the detected light-emitting point and the detected radiated point associated with each other at the associating and information about the conference participant identified at the identifying in the memory in an associated manner.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 3 is a diagram illustrating an example of information stored in a conference participant information storage unit 131,
FIG. 4 is a diagram illustrating an example of information stored in a pointer information storage unit 132,
FIG. 5 is a diagram illustrating an example of information stored in an associated information storage unit 143A,
FIG. 6 is a diagram illustrating an outline of processing of a pointer information linking unit 145,
FIG. 7 is a diagram illustrating an outline of processing of the pointer information linking unit 145.

DESCRIPTION OF EMBODIMENTS

Preferred embodiments of the present invention will be explained with reference to accompanying drawings. In addition, the embodiments do not limit the technique disclosed herein.

[a] First Embodiment

Figure 1:
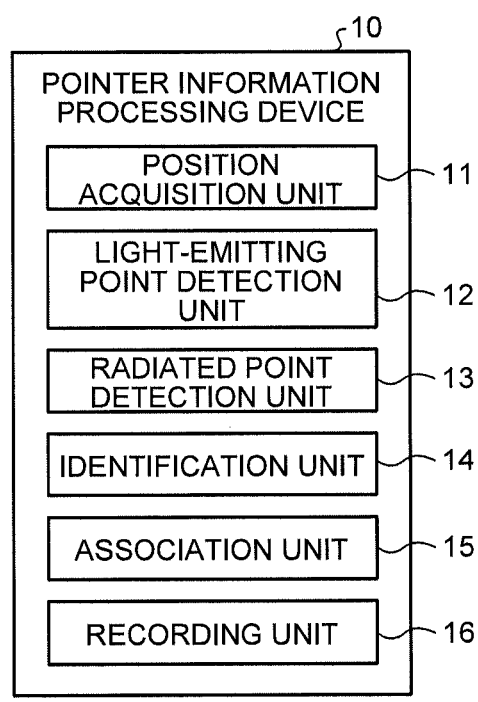
FIG. 1 is a diagram illustrating a pointer information processing device 10 according to a first embodiment.

FIG. 1 is a diagram illustrating a pointer information processing device 10 according to a first embodiment. As illustrated in FIG. 1, the pointer information processing device 10 according to the first embodiment includes a position acquisition unit 11, a light-emitting point detection unit 12, a radiated point detection unit 13, an identification unit 14, an association unit 15, and a recording unit 16.

The position acquisition unit 11 acquires a position of a conference participant in an image captured toward the conference participant. The light-emitting point detection unit 12 detects a light-emitting point of a laser pointer by binarizing a pixel value included in each pixel within the image capturing the direction of the conference participant based on a predetermined threshold value. The radiated point detection unit 13 detects a radiated point of the laser pointer by binarizing a pixel value included in each pixel within an image captured toward an object to which the laser pointer radiates a laser light based on a predetermined threshold value.

The identification unit 14 identifies the conference participant that is using the laser pointer having the light-emitting point by comparing a position of the light-emitting point detected by the light-emitting point detection unit 12 within the image to a position acquired by the position acquisition unit 11. Upon a condition that the light-emitting point detected by the light-emitting point detection unit 12 and the radiated point detected by the radiated point detection unit 13 are each singular, the association unit 15 associates the light-emitting point with the radiated point. The recording unit 16 associates respective position information of the light-emitting point and the radiated point associated with each other by the association unit 15 with information about the conference participant identified by the identification unit 14, and records the information in a storage unit.

As described in the foregoing, for example, the pointer information processing device 10 according to the first embodiment detects a light-emitting point from an image on a conference participant side that uses a laser pointer, and detects a radiated point from an image on a radiation target object side of the laser pointer. Then, upon a condition that the detected light-emitting point of the laser pointer and the detected radiated point of the laser pointer are each singular, the pointer information processing device 10 associates the light-emitting point with the radiated point. Further, the pointer information processing device 10 associates and records respective position information of the light-emitting point and the radiated point associated with each other with information about the conference participant. In this way, for example, the pointer information processing device 10 according to the first embodiment may associate a radiating person with a radiated point of a laser pointer even when the laser pointer excludes a device capable of identifying a person that radiates the radiated point of the laser pointer.

[b] Second Embodiment

Configuration of Conference System (Second Embodiment)

Figure 2:
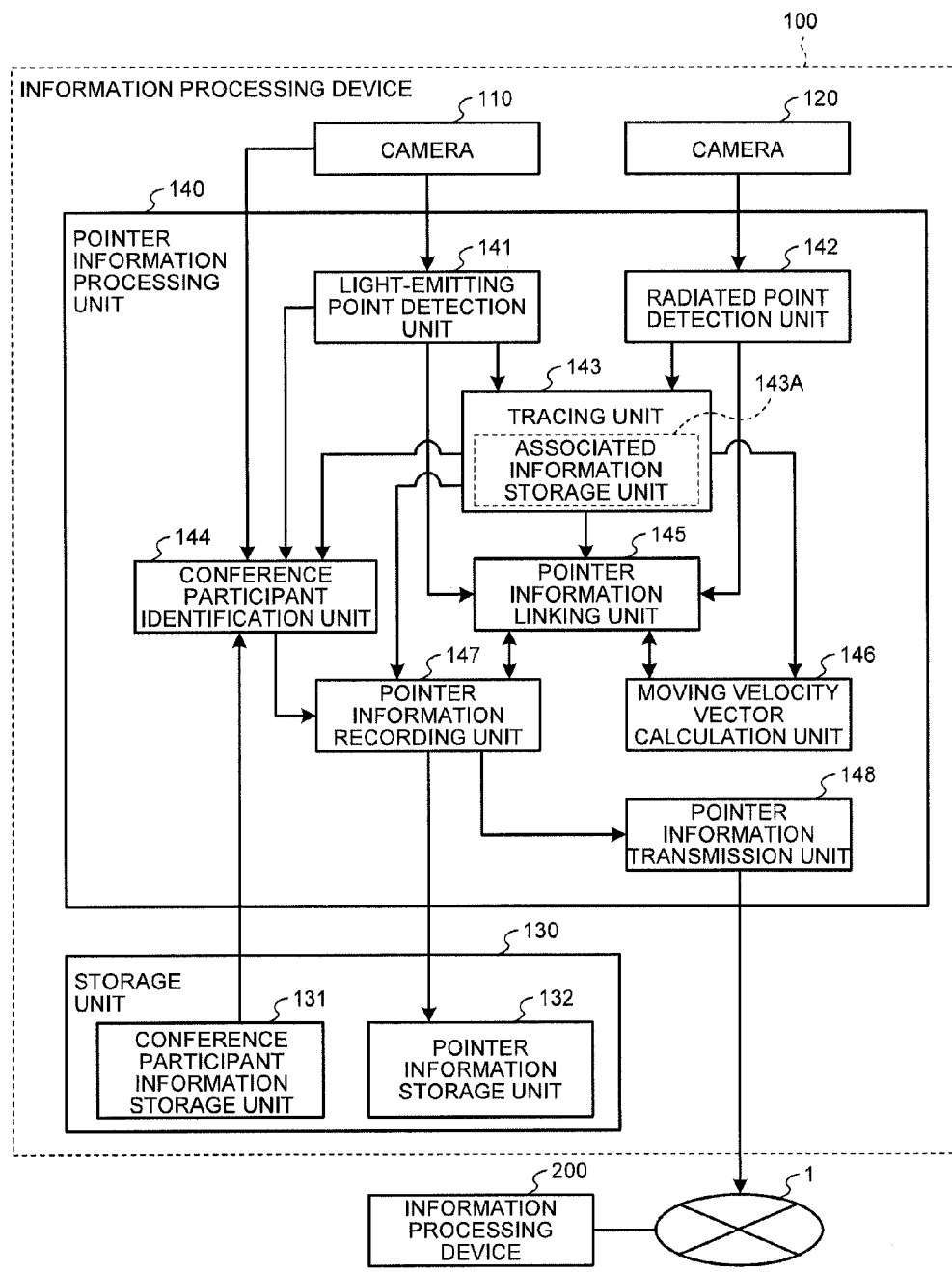
FIG. 2 is a diagram illustrating a configuration of a conference system according to a second embodiment.

FIG. 2 is a diagram illustrating a configuration of a conference system according to a second embodiment. As illustrated in FIG. 2, in the conference system according to the second embodiment, an information processing device 100 and an information processing device 200 provided in respective conference rooms located in different places are connected in a state in which various types of information such as a voice or an image may be exchanged via a network 1. Here, the information processing device 100 and the information processing device 200 include the same configuration, and examples thereof include a general purpose computer such as a personal computer and a server.

As illustrated in FIG. 2, the information processing device 100 provided in a conference room includes a camera 110, a camera 120, a storage unit 130, and a pointer information processing unit 140.

The camera 110 acquires an image captured toward a conference participant. The camera 120 acquires an image captured toward an object to which a laser pointer radiates a laser light, for example, an image captured toward a conference screen or a monitor on which various types of information are projected. Here, the camera 110 and the camera 120 capture an image of a frame for every about thirty milliseconds.

As illustrated in FIG. 2, the storage unit 130 includes a conference participant information storage unit 131 and a pointer information storage unit 132. Here, for example, the storage unit 130 is a semiconductor memory device such as a RAM (Random Access Memory) or a flash memory.

The conference participant information storage unit 131 stores a name of a conference participant and a face recognition template associated with each other. FIG. 3 is a diagram illustrating an example of information stored in the conference participant information storage unit 131. For example, as illustrated in FIG. 3, the conference participant information storage unit 131 stores "Tokkyo Tarou" corresponding to a name of a conference participant and a face recognition template associated with each other. In addition, as illustrated in FIG. 3, the conference participant information storage unit 131 stores "Tokkyo Hanako" corresponding to a name of a conference participant and the face recognition template associated with each other. Here, the face recognition template is used for image processing performed by an identification unit to be described below. The image processing is processing for identifying a person that is using a laser pointer.

The pointer information storage unit 132 stores an ID number uniquely assigned for each item of pointer information, a name of a conference participant, and pointer information associated with one another. The pointer information includes light-emitting point coordinates and radiated point coordinates. FIG. 4 is a diagram illustrating an example of information stored in the pointer information storage unit 132. For example, as illustrated in FIG. 4, the pointer information storage unit 132 stores an ID number "001", a name of a conference participant "Tokkyo Tarou", light-emitting point coordinates "(a, b)", and radiated point coordinates "(c, d)" associated with one another. In addition, for example, as illustrated in FIG. 4, the pointer information storage unit 132 stores an ID number "002", a name of a conference participant "Tokkyo Hanako", light-emitting point coordinates "(e, f)", and radiated point coordinates "(g, h)" associated with one another.

Referring to FIG. 2, the pointer information processing unit 140 includes a light-emitting point detection unit 141, a radiated point detection unit 142, a tracing unit 143, and a conference participant identification unit 144. Further, as illustrated in FIG. 2, the pointer information processing unit 140 includes a pointer information linking unit 145, a moving velocity vector calculation unit 146, a pointer information recording unit 147, and a pointer information transmission unit 148.

Here, for example, the pointer information processing unit 140 corresponds to an electronic circuit or an integrated circuit. Examples of the electronic circuit include a CPU (Central Processing Unit) and an MPU (Micro Processing Unit). In addition, examples of the integrated circuit include an ASIC (Application Specific Integrated Circuit) and an FPGA (Field Programmable Gate Array).

The light-emitting point detection unit 141 detects a light-emitting point of a laser pointer from the inside of an image on a conference participant side acquired by the camera 110. For example, the light-emitting point detection unit 141 detects a light-emitting point of a laser pointer from the inside of an image on a conference participant side by binarizing a pixel value included in each pixel of the image on the conference participant side acquired by the camera 110 based on a predetermined threshold value. Here, when detecting the light-emitting point, the light-emitting point detection unit 141 acquires coordinates of the light-emitting point on the image and a luminance of the light-emitting point.

In addition, the light-emitting point detection unit 141 sets a threshold value to a value smaller than and as close as possible to a pixel value expected to be assigned by a laser pointer. It is intended to effectively bring out only the light-emitting point in the inside of the image on the conference participant side. Here, when a plurality of candidates for the light-emitting point of the laser pointer is detected from the inside of the image on the conference participant side, the light-emitting point detection unit 141 may make a selection from the plurality of candidates by further taking into consideration a luminance or a color of the light-emitting point, and a shape of the light-emitting point of the laser pointer.

The radiated point detection unit 142 detects a radiated point of a laser pointer from the inside of an image, acquired by the camera 120, on an object side to which a laser light is radiated, for example, an image on a screen side. For example, the radiated point detection unit 142 detects a radiated point of a laser pointer from the inside of an image on a screen side by binarizing a pixel value included in each pixel of the image on the screen side acquired by the camera 120 based on a predetermined threshold value. Here, when detecting the radiated point, the radiated point detection unit 142 acquires coordinates of the radiated point on the image and a luminance of the radiated point.

In addition, the radiated point detection unit 142 sets a threshold value to a value smaller than and as close as possible to a pixel value expected to be assigned by a laser pointer. Here, when a plurality of candidates for the light-emitting point of the laser pointer is detected from the inside of the image on the screen side, the radiated point detection unit 142 may make a selection from the plurality of candidates by further taking into consideration a luminance or a color of the radiated point, and a shape of the radiated point of the laser pointer.

As illustrated in FIG. 2, the tracing unit 143 includes an associated information storage unit 143A. Further, while referring to data stored in the associated information storage unit 143A, the tracing unit 143 traces each of a light-emitting point detected by the light-emitting point detection unit 141 and a radiated point detected by the radiated point detection unit 142 by using a known tracing technique. Here, for the known technique used by the tracing unit 143 to trace a light-emitting point and a radiated point, for example, p. 243 to 245 of "digital image processing" published by CG-ARTS association may be referred to.

The above-described associated information storage unit 143A stores an ID number uniquely assigned to a light-emitting point, coordinates of a light-emitting point, luminance data, and movement prediction data associated with one another. In addition, the associated information storage unit 143A stores an ID number uniquely assigned to a radiated point, coordinates of a radiated point, luminance data, and movement prediction data associated with one another. Herein, the luminance data refers to data indicating a brightness of a color of a light-emitting point or a radiated point. The movement prediction data refers to data used to predict a movement of a light-emitting point or a radiated point. For example, movement prediction data of a light-emitting point corresponds to a vector connecting a central location of a light-emitting point within a current image with a central location of a light-emitting point within an image previous to the current image. In addition, for example, movement prediction data of a radiated point corresponds to a vector connecting a central location of a radiated point within a current image with a central location of a radiated point within an image previous to the current image.

FIG. 5 is a diagram illustrating an example of information stored in the associated information storage unit 143A. For example, as illustrated in FIG. 5, the associated information storage unit 143A stores an ID number "001-1", light-emitting point coordinates "(a, b)", luminance data, and movement prediction data associated with one another. In addition, as illustrated in FIG. 5, the associated information storage unit 143A stores an ID number "001-2", radiated point coordinates "(c, d)", luminance data, and movement prediction data associated with one another. In addition, as illustrated in FIG. 5, the associated information storage unit 143A stores an ID number "002-1", light-emitting point coordinates "(e, f)", luminance data, and movement prediction data associated with one another. In addition, as illustrated in FIG. 5, the associated information storage unit 143A stores an ID number "002-2", radiated point coordinates "(g, h)", luminance data, and movement prediction data associated with one another.

Next, an operation of the tracing unit 143 is described. Here, hereinafter, description will be made on the assumption that a radiated point is similarly and naturally detected by the radiated point detection unit 142 when a light-emitting point is detected by the light-emitting point detection unit 141.

For example, when the light-emitting point detection unit 141 detects a light-emitting point from an initial image frame, the tracing unit 143 acquires coordinates and luminance data of the light-emitting point from the light-emitting point detection unit 141. Next, the tracing unit 143 assigns an ID number to the light-emitting point, and records the assigned ID number, the coordinates, and the luminance data associated with one another in the associated information storage unit 143A. Then, the tracing unit 143 starts to trace a light-emitting point by using a known tracing technique.

Similarly, when the radiated point detection unit 142 detects a radiated point from the inside of the initial image frame at a similar time to the detection of the light-emitting point by the light-emitting point detection unit 141, the tracing unit 143 acquires coordinates and luminance data of the radiated point from the radiated point detection unit 142. Next, the tracing unit 143 assigns an ID number to the radiated point, and records the assigned ID number, the coordinates, and the luminance data associated with one another in the associated information storage unit 143A. Then, the tracing unit 143 starts to perform tracing by using a known tracing technique.

Thereafter, each time a light-emitting point and a radiated point are detected by the light-emitting point detection unit 141 and the radiated point detection unit 142, the tracing unit 143 updates coordinates of a light-emitting point and a radiated point, which are being traced, in the associated information storage unit 143A. In addition, the tracing unit 143 assigns respective ID numbers to a new light-emitting point and a new radiated point which are not being traced, and records the assigned ID numbers, coordinates, and luminance data associated with one another in the associated information storage unit 143A. Then, the tracing unit 143 starts to trace a light-emitting point and a radiated point which are newly detected.

Here, the tracing unit 143 generates movement prediction data based on coordinates of a position at which a light-emitting point is initially detected and coordinates of a position at which the light-emitting point is subsequently detected, and records the movement prediction data associated with an ID number that is assigned to the light-emitting point in the associated information storage unit 143A. For example, the movement prediction data is used to trace a light-emitting point by a known technique.

The conference participant identification unit 144 identifies a conference participant that is using a laser pointer. For example, the conference participant identification unit 144 recognizes a face of a conference participant projected into an image on the conference participant side acquired by the camera 110 by using a face recognition template stored in the conference participant information storage unit 131. Then, the conference participant identification unit 144 acquires a position of the conference participant within the image in response to a result of recognizing a face of the conference participant projected into the image on the conference participant side. Then, the conference participant identification unit 144 identifies a conference participant that is using a laser pointer by comparing the position of the light-emitting point within the image detected by the light-emitting point detection unit 141 to the position of the conference participant within the image acquired from the result of recognizing a face.

Here, when a plurality of light-emitting points is detected by the light-emitting point detection unit 141, the conference participant identification unit 144 identifies a conference participant that is using a laser pointer corresponding to each light-emitting point.

Upon a condition that a light-emitting point detected by the light-emitting point detection unit 141 and a radiated point detected by the radiated point detection unit 142 are each singular, the pointer information linking unit 145 associates the light-emitting point with the radiated point.

FIG. 6 is a diagram illustrating an outline of processing of the pointer information linking unit 145. An image 6-1 of FIG. 6 represents an image on a conference participant side and an image on a screen side acquired at a timing. An image 6-2 of FIG. 6 represents an image on a conference participant side and an image on a screen side acquired at a timing subsequent to the image 6-1. A light-emitting point 6-3 of FIG. 6 represents a light-emitting point detected from the image on the conference participant side. A radiated point 6-4 of FIG. 6 represents a radiated point detected from the image on the screen side.

For example, when a light-emitting point and a radiated point are detected by the light-emitting point detection unit 141 and the radiated point detection unit 142, respectively, the pointer information linking unit 145 determines whether both the detected light-emitting point and the detected radiated point are being traced. When the pointer information linking unit 145 determines that both the light-emitting point and the radiated point are being traced as a result of the determination, the pointer information linking unit 145 ends the process.

On the other hand, when it is determined that both the light-emitting point and the radiated point are not being traced as a result of the determination, that is, when a new light-emitting point and a new radiated point which are not being traced are present, the pointer information linking unit 145 determines whether the new light-emitting point and the new radiated point which are not being traced are each singular. When each of the new light-emitting point that is not being traced and the new radiated point that is not being traced is singular as a result of the determination, the pointer information linking unit 145 associates the new light-emitting point that is not being traced with the new radiated point that is not being traced.

On the other hand, when each of the new light-emitting point and the new radiated point which are not being traced is not singular as a result of the determination, the pointer information linking unit 145 requests the moving velocity vector calculation unit 146 to calculate moving velocity vectors of respective light-emitting points and respective radiated points. Then, the pointer information linking unit 145 associates a light-emitting point with a radiated point based on a correspondence relation between a light-emitting point and a radiated point informed from the moving velocity vector calculation unit 146. Hereinafter, an example of a case in which each of the new light-emitting point that is not being traced and the new radiated point that is not being traced is not singular will be described using FIG. 7.

FIG. 7 is a diagram illustrating an outline of processing of the pointer information linking unit 145. An image 7-1 of FIG. 7 represents an image on a conference participant side and an image on a screen side acquired at a timing. An image 7-2 of FIG. 7 represents an image on a conference participant side and an image on a screen side acquired at a timing subsequent to the image 7-1. Light-emitting points 7-3 and 7-4 of FIG. 7 represent a plurality of light-emitting points detected from the image on the conference participant side. Radiated points 7-5 and 7-6 of FIG. 7 represent a plurality of radiated points detected from the image on the screen side.

For example, as illustrated in FIG. 7, the pointer information linking unit 145 associates the light-emitting point 7-3 with the radiated point 7-5, and associates the light-emitting point 7-4 with the radiated point 7-6 based on the correspondence relation between a light-emitting point and a radiated point informed from the moving velocity vector calculation unit 146. Here, a combination of the light-emitting point 7-3 and the radiated point 7-5, and a combination of the light-emitting point 7-4 and the radiated point 7-6 correspond to a combination of a light-emitting point and a radiated point matching or close to a moving velocity vector calculated by the moving velocity vector calculation unit 146.

Figure 8:
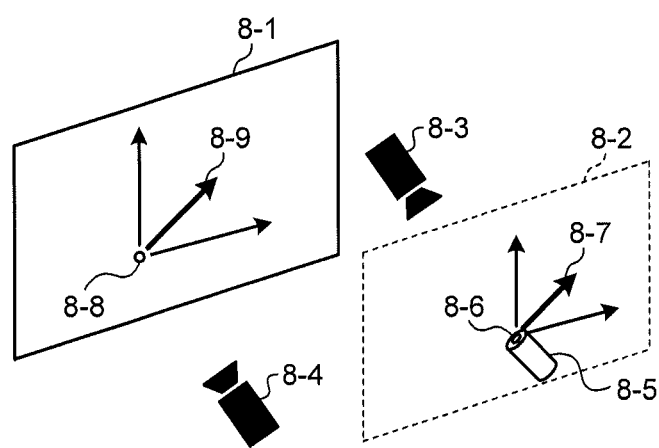
FIG. 8 is a diagram illustrating an outline of processing performed by a moving velocity vector calculation unit 146.
Figure 9:
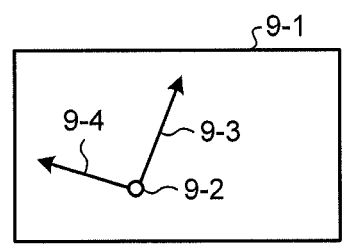
FIG. 9 is a diagram illustrating an outline of processing performed by the moving velocity vector calculation unit 146.
Figure 10:
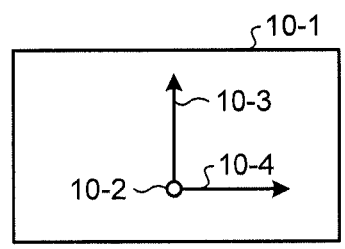
FIG. 10 is a diagram illustrating an outline of processing performed by the moving velocity vector calculation unit 146.

The moving velocity vector calculation unit 146 calculates respective moving velocity vectors of each light-emitting point detected from an image on the conference participant side and each radiated point detected from an image on the screen side. Hereinafter, an outline of processing performed by the moving velocity vector calculation unit 146 will be described using FIGS. 8 to 10. FIGS. 8 to 10 are diagrams illustrating an outline of processing performed by the moving velocity vector calculation unit 146.

A screen 8-1 illustrated in FIG. 8 is a model representing a screen which is a laser light radiation target object. A virtual plane 8-2 illustrated in FIG. 8 is a model representing a virtual plane parallel to the screen 8-1. A camera 8-3 illustrated in FIG. 8 is a model representing a camera capturing a conference participant side, and corresponds to the above-described camera 110. A camera 8-4 illustrated in FIG. 8 is a model representing a camera capturing a screen side, and corresponds to the above-described camera 120. A laser pointer 8-5 illustrated in FIG. 8 is a model representing a laser pointer. A light-emitting point 8-6 illustrated in FIG. 8 represents a light-emitting point of the laser pointer. A moving velocity vector 8-7 illustrated in FIG. 8 represents a moving velocity vector of the light-emitting point of the laser pointer. A radiated point 8-8 illustrated in FIG. 8 represents a radiated point of the laser pointer. A moving velocity vector 8-9 illustrated in FIG. 8 represents a moving velocity vector of the radiated point of the laser pointer.

First, as illustrated in FIG. 8, in a conference, the moving velocity vector calculation unit 146 sets a condition in which the light-emitting point 8-6 of the laser pointer 8-5 is assumed to move on the virtual plane 8-2 parallel to the screen 8-1. Next, the moving velocity vector calculation unit 146 acquires an image using the cameras 8-3 and 8-4 when the laser pointer 8-5 is moved in a horizontal and vertical direction. Then, as illustrated in FIG. 9, the moving velocity vector calculation unit 146 calculates a vertical vector 9-3 and a horizontal vector 9-4 of a light-emitting point 9-2 moving on an image 9-1 that is acquired from the camera 8-3.

Similarly, as illustrated in FIG. 10, the moving velocity vector calculation unit 146 calculates a vertical vector 10-3 and a horizontal vector 10-4 of a radiated point 10-2 moving on an image 10-1 that is acquired from the camera 8-4. Each of the vertical vector 9-3, the horizontal vector 9-4, the vertical vector 10-3, and the horizontal vector 10-4 may be normalized.

Then, the moving velocity vector calculation unit 146 calculates Equation (1) representing the moving velocity vector 8-7 of the light-emitting point, and Equation (2) representing the moving velocity vector 8-9 of the radiated point. Here, the moving velocity vector 8-7 corresponds to [v] represented in Equation (1) below, the vertical vector 9-3 of the light-emitting point 9-2 corresponds to [a] represented in Equation (1) below, and the horizontal vector 9-4 of the light-emitting point 9-2 corresponds to [b] represented in Equation (1) below. In addition, the moving velocity vector 8-9 corresponds to [v'] represented in Equation (2) below, the vertical vector 10-3 of the radiated point 10-2 corresponds to [a'] represented in Equation (2) below, and the horizontal vector 10-4 of the radiated point 10-2 corresponds to [b'] represented in Equation (2) below.

$$[v] = p[a] + q[b] \quad (1)$$

$$[v'] = r[a'] + s[b'] \quad (2)$$

Here, values [p] and [q] represented in Equation (1), and values [r] and [s] represented in Equation (2) have scalar quantities.

The moving velocity vector calculation unit 146 acquires coordinates, which are updated by the tracing unit 143, of each light-emitting point detected from the image on the conference participant side and each radiated point detected from the image on the screen side in a subsequent image frame. Then, the moving velocity vector calculation unit 146 calculates moving velocity vectors of each light-emitting point detected from the image on the conference participant side and each radiated point detected from the image on the screen side.

Next, the moving velocity vector calculation unit 146 expresses the calculated moving velocity vectors of each light-emitting point and each radiated point by using Equation (1) and Equation (2) described above by adjusting the scalar quantities of Equation (1) and Equation (2) described above. Then, the moving velocity vector calculation unit 146 calculates each of the scalar quantities [p], [q], [r], and [s] by modifying each equation expressing the moving velocity vectors of each light-emitting point and each radiated point. The scalar quantities [p], [q], [r], and [s] are expressed by following Equations (3) and (4).

$$[p] = [a] \times [v], [q] = [b] \times [v] \quad (3)$$

$$[r] = [a'] \times [v'], [s] = [b'] \times [v'] \quad (4)$$

Next, the moving velocity vector calculation unit 146 compares the scalar quantities [p] and [r] related to a vertical vector component, and the scalar quantities [q] and [s] related to a horizontal vector component, respectively, of the moving velocity vectors of each light-emitting point and each radiated point. Next, the moving velocity vector calculation unit 146 identifies a combination of moving velocity vectors matching or close to [p] and [r], and [q] and [s]. Then, the moving velocity vector calculation unit 146 obtains a correspondence relation between a light-emitting point and a radiated point corresponding to the identified combination of moving velocity vectors, and informs the pointer information linking unit 145 of the obtained correspondence relation.

The pointer information recording unit 147 assigns an ID number to each combination of a light-emitting point and a radiated point associated with each other by the pointer information linking unit 145. Then, the pointer information recording unit 147 records an ID number, coordinates of a light-emitting point and a radiated point associated with each other by the pointer information linking unit 145, and information about a conference participant identified by the conference participant identification unit associated with one another in the pointer information storage unit 132. In addition, when coordinates of a light-emitting point and a radiated point are updated by the tracing unit 143, the pointer information recording unit 147 updates the coordinates of the light-emitting point and the radiated point stored in the pointer information storage unit 132 to match the update.

The pointer information transmission unit 148 associates the coordinates of the light-emitting point and the radiated point recorded or updated by the pointer information recording unit 147 with the information about the identified conference participant, and transmits the coordinates associated with the information to the other information processing device 200 conducting a conference.

Processing Performed by Pointer Information Processing Unit (Second Embodiment)

Figure 11:
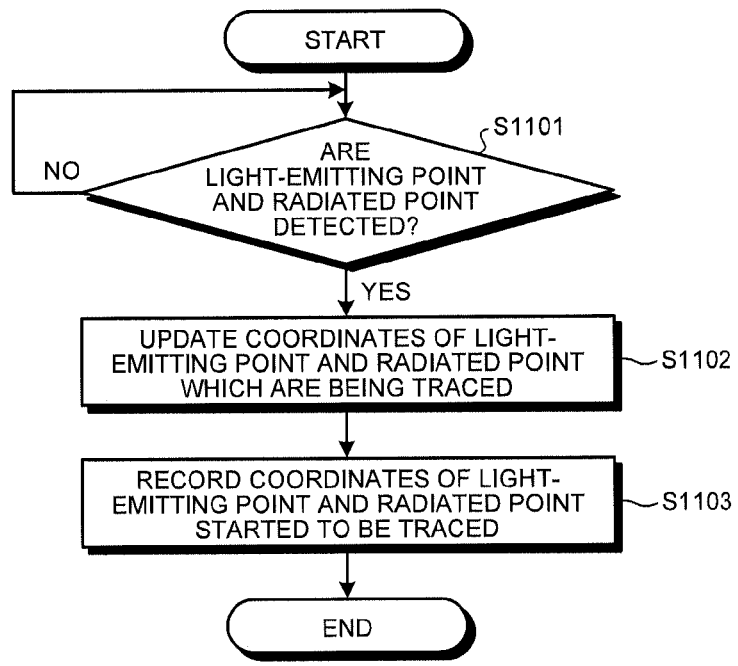
FIG. 11 is a diagram illustrating a flow of processing performed by a pointer information processing unit 140.
Figure 12:
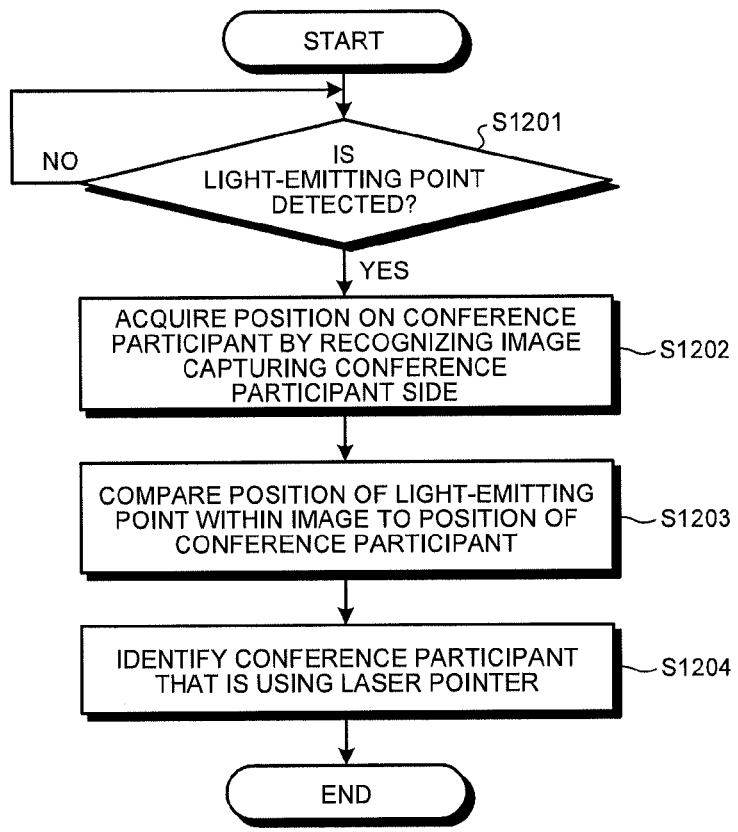
FIG. 12 is a diagram illustrating a flow of processing performed by the pointer information processing unit 140.
Figure 13:
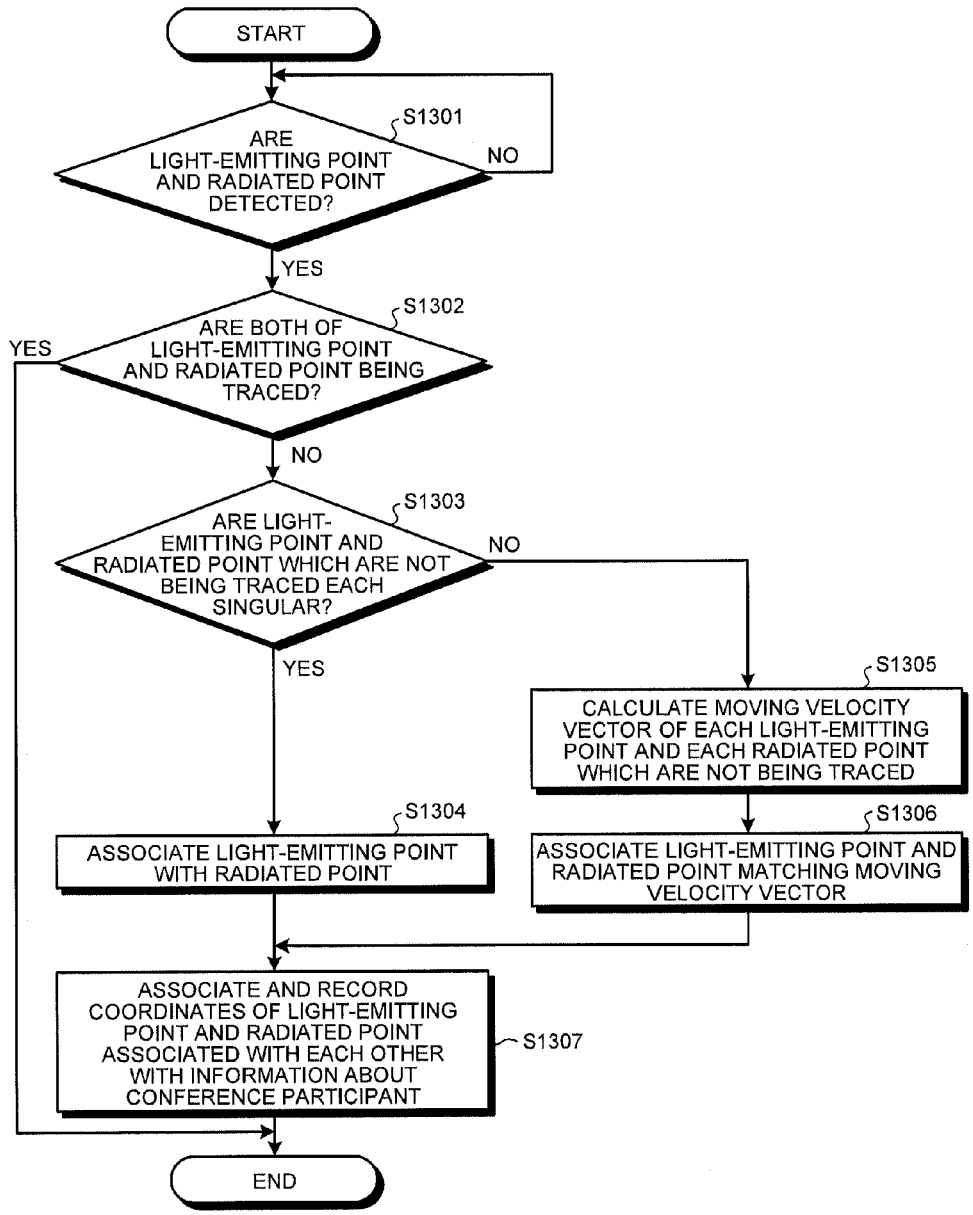
FIG. 13 is a diagram illustrating a flow of processing performed by the pointer information processing unit 140.

FIGS. 11 to 13 are diagrams illustrating a flow of processing performed by the above-described pointer information processing unit 140. First, a flow of processing of the pointer information processing unit 140 through the tracing unit 143 is described using FIG. 11.

As illustrated in FIG. 11, when a light-emitting point is detected by the light-emitting point detection unit 141, and a radiated point is detected by the radiated point detection unit 142 (Yes in step S1101), the tracing unit 143 performs the following processing. The tracing unit 143 updates coordinates of a light-emitting point and a radiated point which are being traced and stored in the associated information storage unit 143A (step S1102). Then, the tracing unit 143 assigns respective ID numbers to a new light-emitting point and a new radiated point which are not being traced, and records the ID numbers and coordinates of the light-emitting point and the radiated point associated with each other in the associated information storage unit 143A (step S1103).

Herein, description returns to step S1101. When a light-emitting point and a radiated point have not been detected by the light-emitting point detection unit 141 and the radiated point detection unit 142, a result of the determination of step S1101 is set to No, and the same determination is repeated.

Next, a flow of processing performed by the conference participant identification unit 144 of the pointer information processing unit 140 is described using FIG. 12.

As illustrated in FIG. 12, when a light-emitting point is detected by the light-emitting point detection unit 141 (Yes in step S1201), an image recognition of an image on a conference participant side is performed to acquire a position of a conference participant within the image (step S1202).

Next, the conference participant identification unit 144 compares the position of the light-emitting point within the image detected by the light-emitting point detection unit 141 to the position of the conference participant within the image acquired by a result of the face recognition (step S1203). Then, the conference participant identification unit 144 identifies the conference participant that is using a laser pointer based on a result of step S1203 (step S1204).

Herein, description returns to step S1201. When a light-emitting point has not been detected by the light-emitting point detection unit 141, the conference participant identification unit 144 sets a result of the determination of step S1201 to No, and repeats the same determination.

Next, a flow of processing performed by the pointer information linking unit 145, the moving velocity vector calculation unit 146, and the pointer information recording unit 147 of the pointer information processing unit 140 is described using FIG. 13.

As illustrated in FIG. 13, when a light-emitting point is detected by the light-emitting point detection unit 141, and a radiated point is detected by the radiated point detection unit 142 (Yes in step S1301), the pointer information linking unit 145 performs the following processing. The pointer information linking unit 145 determines whether both the detected light-emitting point and the detected radiated point are being traced (step S1302). When both the light-emitting point and the radiated point are being traced as a result of the determination (Yes in step S1302), the pointer information linking unit 145 ends the processing.

On the other hand, when both the light-emitting point and the radiated point are not being traced as a result of the determination, that is, when a new light-emitting point and a new radiated point which are not being traced are present (No in step S1302), the pointer information linking unit 145 performs the following processing. That is, the pointer information linking unit 145 determines whether the light-emitting point and the radiated point are each singular (step S1303). When a new light-emitting point and a new radiated point which are not being traced are each singular as a result of the determination (Yes in step S1303), the pointer information linking unit 145 associates the new light-emitting point which is not being traced with the new radiated point which is not being traced (step S1304).

On the other hand, when the new light-emitting point and the new radiated point which are not being traced are not each singular as a result of the determination (No in step S1303), the pointer information linking unit 145 performs the following processing. The pointer information linking unit 145 requests the moving velocity vector calculation unit 146 to calculate moving velocity vectors of each light-emitting point and each radiated point. The moving velocity vector calculation unit 146 calculates respective moving velocity vectors of each light-emitting point detected from the image on the conference participant side, and each radiated point detected from an image on a screen side (step S1305).

Then, the moving velocity vector calculation unit 146 informs the pointer information linking unit 145 of a correspondence relation between a light-emitting point and a radiated point matching or close to a moving velocity vector. The pointer information linking unit 145 associates a light-emitting point and a radiated point with each other matching or close to a moving velocity vector of each new light-emitting point and each new radiated point based on the correspondence relation between a light-emitting point and a radiated point informed from the moving velocity vector calculation unit 146 (step S1306).

The pointer information recording unit 147 records an ID number, coordinates of the light-emitting point and the radiated point associated with each other by the pointer information linking unit 145, and information about the conference participant identified by the conference participant identification unit associated with each other in the pointer information storage unit 132 (step S1307).

Herein, description returns to step S1301. When a light-emitting point has not been detected by the light-emitting point detection unit 141, the pointer information linking unit 145 sets the result of the determination of step S1301 to No, and repeats the same determination.

Effect of Second Embodiment

As described in the foregoing, the pointer information processing unit 140 associates a light-emitting point with a radiated point upon a condition that the detected light-emitting point and the detected radiated point of the laser pointer are each singular. Then, the pointer information processing unit 140 records respective position information of a light-emitting point associated with a radiated point and information about the conference participant associated with each other. As such, according to the second embodiment, a radiated point and a radiating person of a laser pointer may be associated with each other using a laser pointer excluding a device capable of identifying a person that radiates a radiated point of the laser pointer.

In addition, in a case where detected light-emitting points and detected radiated points of a laser pointer are not each singular, when a light-emitting point and a radiated point excluding a point that is being traced are each singular, the pointer information processing unit 140 associates the light-emitting point with the radiated point. As such, according to the second embodiment, even when a plurality of detected light-emitting points and a plurality of detected radiated points of a laser pointer are present, it is possible to associate a radiated point with a radiating person of a laser pointer excluding a device capable of identifying a person that radiates a radiated point of the laser pointer.

In addition, when light-emitting points and radiated points excluding a point, which is being traced, from detected light-emitting points and radiated points are not each singular, the pointer information processing unit 140 associates a light-emitting point with a radiated point based on a moving velocity vector of the light-emitting point and the radiated point. As such, even when a plurality of light-emitting points and a plurality of radiated points excluding a point, which is being traced, from detected light-emitting points and radiated points are present, it is possible to associate a radiated point with a radiating person of a laser pointer excluding a device capable of identifying a person that radiates radiated point of the laser pointer.

In addition, the pointer information processing unit 140 associates a radiated point and a radiating person of a laser pointer with each other, and transmits the radiated point and the radiating person to the information processing device 200 on the other person side conducting a conference. As such, even when a plurality of radiated points of laser pointers are displayed on a screen, it is possible to clearly report a user of a laser pointer corresponding to each radiated point.

[c] Third Embodiment

Hereinafter, another embodiment of the pointer information processing device, the pointer information processing program, and the conference system discussed in this application will be described.

(1) Device Configuration

For example, a configuration of the pointer information processing unit 140 of FIG. 2 illustrates a conceptual function, and is not necessarily physically configured as being illustrated. For example, the pointer information linking unit 145 and the moving velocity vector calculation unit 146 of the pointer information processing unit 140 illustrated in FIG. 2 may be functionally or physically integrated. In this way, a portion of or the entire pointer information processing unit 140 may be functionally or physically divided or integrated in an arbitrary unit according to various types of loads or use conditions.

(2) Pointer Information Processing Program

In addition, for example, various types of processing performed by the pointer information processing unit 140 described in the above Embodiments may be implemented by executing a program prepared in advance using an electronic device such as a personal computer. Here, FIGS. 11 to 13 may be referred to for various types of processing of the pointer information processing unit 140.

Figure 14:
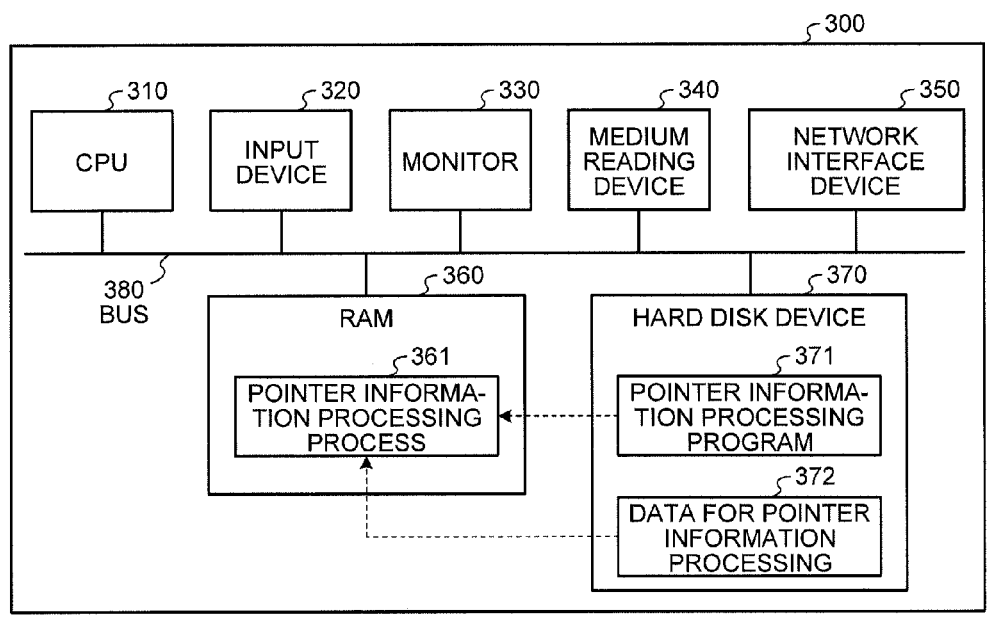
FIG. 14 is a diagram illustrating an example of a computer that executes a pointer information processing program.

Thus, hereinafter, description will be made on an example of a computer that executes a pointer information processing program implementing a similar function to that of processing performed by the pointer information processing unit 140 described in the above Embodiments with reference to FIG. 14. FIG. 14 is a diagram illustrating an example of a computer that executes a pointer information processing program.

As illustrated in FIG. 14, a computer 300 implementing a similar function to that of the pointer information processing unit 140 includes a CPU (Central processing Unit) 310 that performs various types of arithmetic processing, an input device 320 that receives an input of data from a user, and a monitor 330.

In addition, as illustrated in FIG. 14, the computer 300 includes a medium reading device 340 that reads a program from a storage medium, and a network interface device 350 that exchanges data with another computer via a network. In addition, as illustrated in FIG. 14, the computer 300 includes a RAM (Random Access Memory) 360 that temporarily stores various types of information, and a hard disk device 370. Moreover, each of the devices 310 to 370 is connected to a bus 380.

Here, the input device 320 is, for example, a keyboard or a mouse. Here, when the input device 320 includes a mouse, a pointing device function may be implemented by cooperating with the monitor 330 (not illustrated). In addition, when the input device 320 includes another input device such as a touch pad, a pointing device function may be implemented similarly to a case of the mouse.

In addition, instead of the CPU 310, for example, it is possible to use an electronic circuit such as an MPU (Micro Processing Unit) and an integrated circuit such as an ASIC (Application Specific Integrated Circuit) and an FPGA (Field Programmable Gate Array). In addition, instead of the RAM 360, it is possible to use a semiconductor memory device such as a flash memory.

The hard disk device 370 stores a pointer information processing program 371 and data for pointer information processing 372 that exhibit a similar function to a function of the above-described pointer information processing unit 140. Here, the pointer information processing program 371 is appropriately divided to be stored in a storage unit of another computer connected via a network to perform communication.

Moreover, as illustrated in FIG. 14, when the CPU 310 reads the pointer information processing program 371 from the hard disk device 370 and develops the pointer information processing program 371 on the RAM 360, the pointer information processing program 371 functions as a pointer information processing process 361. The pointer information processing process 361 appropriately develops various types of data such as the data for pointer information processing 372 read from the hard disk device 370 in an allocated area on the RAM 360, and performs various types of processing based on the various types of developed data.

Here, for example, the pointer information processing process 361 includes processing executed by the pointer information processing unit 140 illustrated in FIG. 2.

Here, the pointer information processing program 371 is not necessarily stored in the hard disk device 370 from the first. For example, each program is stored in a "portable physical medium" such as a flexible disk (FD), a Compact Disk Read Only Memory (CD-ROM), a Digital Versatile Disk (DVD), a magneto-optical disk, or an Integrated Circuit (IC) card, that is inserted into the computer 300. Then, the computer 300 may read each program from the medium, and execute each program.

Further, each program may be stored in "another computer (or server)" connected to the computer 300 via a public line, the Internet, a LAN, a WAN, or the like. Then, the computer 300 may read each program from the other computer, and execute each program.

According to an aspect of a technique disclosed in this application, it is possible to associate a radiated point and a radiating person of a laser pointer with each other even when the laser pointer excludes a device capable of identifying a person that radiates a radiated point of the laser pointer.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A pointer information processing device comprising:
a memory; and
a processor coupled to the memory, wherein the processor executes a process comprising:
acquiring a position of a conference participant in a first image captured toward the conference participant;

detecting a light-emitting point of a laser pointer by binarizing a pixel value included in each pixel within the first image based on a predetermined threshold value;

detecting a radiated point of the laser pointer by binarizing a pixel value included in each pixel within a second image captured toward an object to which the laser pointer radiates a laser light based on a predetermined threshold value;

identifying the conference participant that is using the laser pointer having the light-emitting point by comparing a position of the detected light-emitting point within the first image to the acquired position of the conference participant;

associating the detected light-emitting point with the detected radiated point upon a condition that the detected light-emitting point and the detected radiated point are each singular; and recording respective position information of the detected light-emitting point and the detected radiated point associated with each other at the associating and information about the conference participant identified at the identifying in the memory in an associated manner.

2. The pointer information processing device according to claim 1, wherein the process further comprises tracing each of the detected light-emitting point and the detected radiated point, the identifying includes identifying the conference participant by comparing a position of a light-emitting point within the first image remaining after excluding a light-emitting point that is being traced at the tracing from the detected light-emitting points to the acquired position of the conference participant, the associating includes associating a new light-emitting point remaining after excluding the light-emitting point that is being traced at the tracing from the detected light-emitting points with a new radiated point remaining after excluding the radiated point that is being traced at the tracing from the detected radiated points upon a condition that the new light-emitting point and the new radiated point are each singular, and the recording includes updating respective position information of the light-emitting point and the radiated point stored in the memory based on a result of tracing the light-emitting point and the radiated point at the tracing, associating respective position information of the light-emitting point and the radiated point newly associated with each other at the associating with information about the conference participant identified at the identifying, and recording the respective position information and the information about the conference participant in the memory.

3. The pointer information processing device according to claim 2, wherein the process further comprises calculating respective moving velocity vectors of each light-emitting point and each radiated point when a plurality of the remaining light-emitting points and a plurality of the remaining radiated points are present, and the associating includes associating a new light-emitting point and a new radiated point with each other matching the moving velocity vector among the plurality of light-emitting points and the plurality of radiated points based on the calculated moving velocity vectors.

4. A non-transitory computer-readable recording medium having stored therein a pointer information processing program for causing a computer to execute a process comprising:

acquiring a position of a conference participant in a first image captured toward the conference participant;

detecting a light-emitting point of a laser pointer by binarizing a pixel value included in each pixel within the first image based on a predetermined threshold value;

detecting a radiated point of the laser pointer by binarizing a pixel value included in each pixel within a second image captured toward an object to which the laser pointer radiates a laser light based on a predetermined threshold value;

identifying the conference participant that is using the laser pointer having the light-emitting point by comparing a position of the detected light-emitting point within the first image to the acquired position of the conference participant;

associating the detected light-emitting point with the detected radiated point upon a condition that the detected light-emitting point and the detected radiated point are each singular; and recording respective position information of the detected light-emitting point and the detected radiated point associated with each other at the associating and information about the conference participant identified at the identifying in a storage unit in an associated manner.

5. A conference system for conducting a remote conference between information processing devices provided in each of conference rooms in difference places, one of the information processing devices comprising:

a memory; and a processor coupled to the memory, wherein the processor executes a process comprising:

acquiring a position of a conference participant in a first image captured toward the conference participant;

detecting a light-emitting point of a laser pointer by binarizing a pixel value included in each pixel within the first image based on a predetermined threshold value;

detecting a radiated point of the laser pointer by binarizing a pixel value included in each pixel within a second image captured toward an object to which the laser pointer radiates a laser light based on a predetermined threshold value;

identifying the conference participant that is using the laser pointer having the light-emitting point by comparing a position of the detected light-emitting point within the first image to the acquired position of the conference participant;

associating the detected light-emitting point with the detected radiated point upon a condition that the detected light-emitting point and the detected radiated point are each singular; and recording respective position information of the detected light-emitting point and the detected radiated point associated with each other at the associating and information about the conference participant identified at the identifying in the memory in an associated manner; and transmitting the position information of the recorded radiated point and the information about the conference participant associated with the position information to the information processing device provided within another conference room.

* * * * *